United States Patent [19]
Conway

[11] Patent Number: 5,158,105
[45] Date of Patent: Oct. 27, 1992

[54] ANTI-SIPHON FREEZELESS HYDRANT

[76] Inventor: Scott T. Conway, 613 W. 59th St., Kansas City, Mo. 64113

[21] Appl. No.: 812,402

[22] Filed: Dec. 23, 1991

[51] Int. Cl.[5] .................... E03B 7/12; E03B 9/14; F16K 11/044
[52] U.S. Cl. .................... 137/296; 137/302; 137/360; 137/614.13; 137/625.27; 251/318
[58] Field of Search ............... 137/218, 302, 360, 377, 137/381, 59, 62, 614.13, 625.26, 625.27; 251/318, 339

[56] References Cited

U.S. PATENT DOCUMENTS

| | | | |
|---|---|---|---|
| D. 216,791 | 3/1970 | Woodford | D23/12 |
| 2,752,938 | 7/1956 | Owens | 137/218 |
| 3,392,745 | 7/1968 | Noland | 137/301 |
| 3,414,001 | 12/1968 | Woodford | 137/216 |
| 3,424,189 | 1/1969 | Woodford | 137/218 |
| 3,480,027 | 11/1969 | Noland | 137/59 |
| 3,504,694 | 4/1970 | Noland | 137/303 |
| 3,566,905 | 3/1971 | Noland | 137/301 |
| 3,581,761 | 6/1971 | Noland | 137/307 |
| 3,929,150 | 12/1975 | Flinner et al. | 137/218 |
| 3,952,770 | 4/1976 | Botnick | 137/218 |
| 4,178,956 | 12/1979 | Fillman | 137/302 |
| 4,182,356 | 1/1980 | Woodford, Sr. | 137/59 |
| 4,316,481 | 2/1982 | Fillman | 137/302 |
| 4,475,570 | 10/1984 | Pike et al. | 137/218 |
| 4,532,954 | 8/1985 | Fillman | 137/302 |
| 4,821,762 | 4/1989 | Breneman | 137/218 |
| 4,909,270 | 3/1990 | Enterante, Sr. et al. | 137/218 |
| 4,976,279 | 12/1990 | King, Sr. et al. | 137/218 |

*Primary Examiner*—George L. Walton
*Attorney, Agent, or Firm*—Litman, McMahon & Brown

[57] ABSTRACT

An anti-siphon and freezeless water hydrant comprises a unitary cast metal housing which incorporates a hose bib, and a drain opening cylinder equipped with drain orifices and a drain valve seat. The housing is shaped and labeled to assure installation so that the hose bib is higher than the drain opening cylinder. A unitary valve stem includes an integral drain valve element which selectively engages or disengages the inside of the drain opening cylinder to shut off or open the drain orifices and a water valve element which selectively engages or disengages a water valve seat within the hydrant to act as a water valve. When the water valve is fully closed, the drain valve element opens the drain opening cylinder to permit water trapped within the hydrant to drain through the the drain orifices. The hose bib is equipped with a vacuum valve to prevent back-siphoning of fluids from a hose attached to the hydrant.

15 Claims, 2 Drawing Sheets

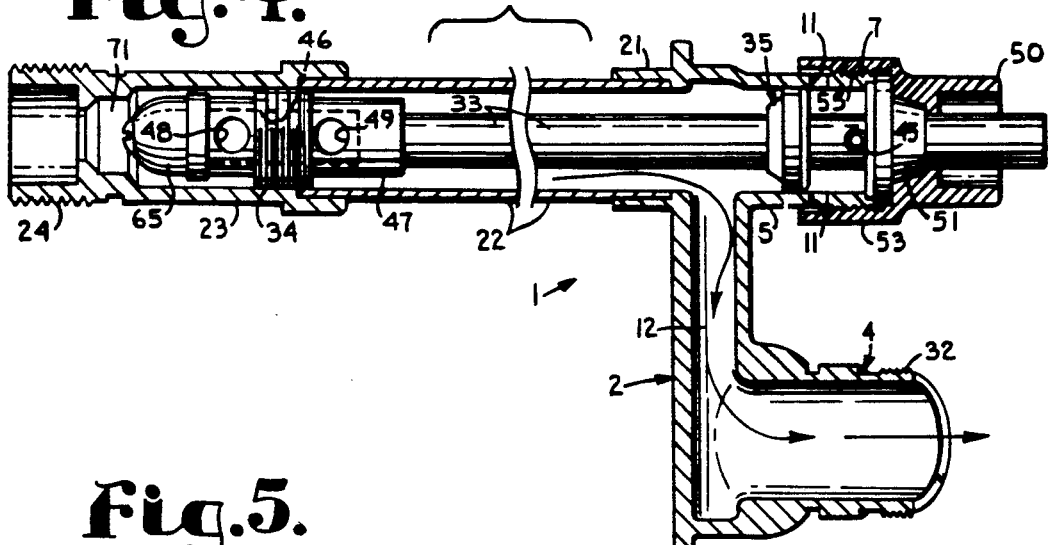
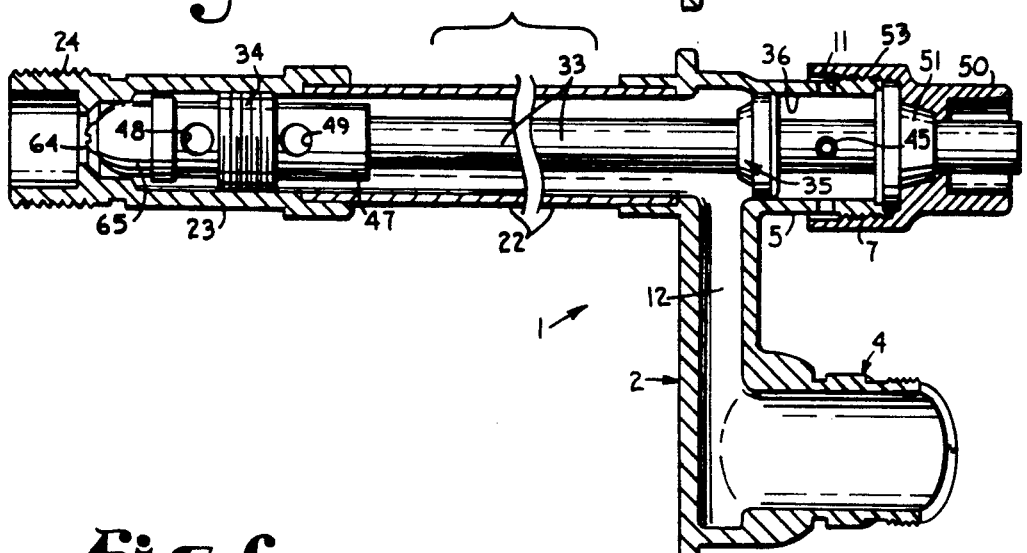
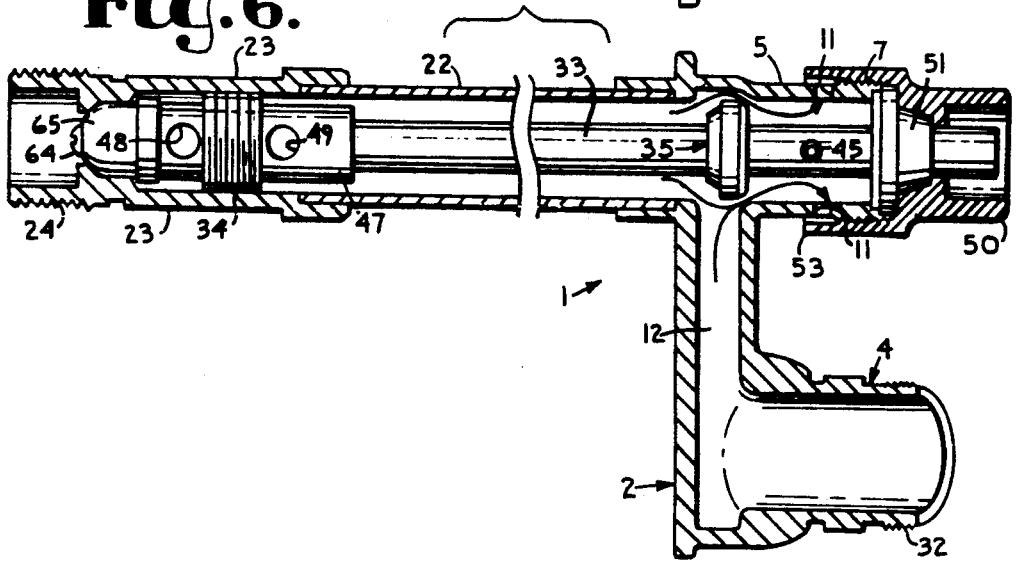

ANTI-SIPHON FREEZELESS HYDRANT

BACKGROUND OF THE INVENTION

The present invention relates to a water hydrant or faucet of the type which connects a water supply conduit located inside a building to a hose connection located outside the building.

In such hydrants which are exposed to ambient temperatures below freezing, an automatic drain mechanism must be incorporated or the water left standing in the hydrant will freeze and block the hydrant. In severe conditions, the hydrant can burst due to the expansion of the frozen water. Furthermore, such hydrants are subject to back-siphoning of water from a connected hose when the end of the hose is immersed in a tank of liquid and the pressure in the supply line drops for some reason. Particularly when the hydrant is used for industrial or farming purposes, this back siphoning can draw chemicals or other pollutants into the water supply lines and cause contamination of the potable water therein.

Numerous hydrant and faucet designs have been devised to prevent freeze blockage or damage as well as back-siphoning. Typical so-called freezeless faucets usually incorporate a double valve arrangement. As the hydrant is opened, e.g. by turning a threaded valve stem attached to a circular handle, an drain vent valve closes to block least one drainage vent. Subsequent turns of the handle then open a water supply valve to admit water from the supply conduit into the hydrant and hose bib. In order to shut off the hydrant, the handle is turned in the opposite direction, which closes the water supply valve. Subsequent turning of the handle then opens the drain vent valve which opens the drainage vents to drain any water trapped in the hydrant.

Back-siphoning of liquids from a connected hose is prevented by an anti-siphoning vacuum valve which is typically attached to the hose bib itself. The vacuum valve is generally a spring loaded valve which opens due to water pressure from the supply conduit exerted against the action of the spring. In the event of a drop in water supply pressure, the spring urges the valve closed, thus preventing any liquid from being siphoned from the hose back into the hydrant. Typically, vacuum valves also incorporate air vents which open when the vacuum valve is closed to aid in draining the hydrant.

Many hydrants or faucets incorporate both freezeless and anti-siphoning features. With increased concern for contamination of potable water sources, it is becoming common for water supply companies to require anti-siphoning devices on any hydrant connected to their systems.

Typical prior art anti-siphoning and freezeless hydrants have tended to be intricate mechanisms incorporating many separable parts. In some freezeless hydrants, a dual conduit runs from the water supply valve through the wall to separate hose bib and drain outlets. This necessitates a complex machined part which is expensive to produce in quantity. Other freezeless hydrants have used valve stems with removable drain valve elements which comprise as many as four different parts. Another problem with prior art freezeless hydrants has been that the hydrant can be oriented in a manner which does not permit complete drainage even with an open drain vent.

Yet another problem with such freezeless hydrants is that when the hydrant is shut off with a hose attached, back pressure from the hose and remaining water pressure within the hydrant causes water to spray out of the drainage vents when the drain vent valve is opened. Without some sort of splash guard, it is not uncommon for the person operating the hydrant can get thoroughly soaked.

It is clear then, that a need exists for an anti-siphoning freezeless water hydrant which is simple and inexpensive to produce. Such a hydrant should incorporate as few working parts as possible and should be clearly designed for proper drainage orientation during installation. The hydrant should include an integral splash guard to protect the user from water spraying from the drainage vents.

SUMMARY OF THE INVENTION

The present invention is an anti-siphoning freezeless water hydrant for conducting water from a water supply within a building to an outlet located outside the building.

The hydrant comprises a single cast metal housing which includes an drain valve seat within a drain opening cylinder, a hose bib connection, and a channel extending between the drain opening cylinder and the hose bib. The housing also includes drainage vents in threaded portions of the drain opening cylinder to accommodate a valve stem and an integral splash guard, a circular seat for attachment to a internally threaded water valve seat and conduit, and a rectangular flange surrounding the drain opening cylinder and the hose bib. The surrounding flange is oriented to place the entire hose bib above the drain opening cylinder for proper drainage and is labeled to give an indication of proper orientation of the hydrant during installation.

The hydrant includes a unitary valve stem which includes the drain valve integrally attached thereto. The valve stem is threadably attached at one end to a water valve element and at the other end to a circular valve handle, and has external threads near the water valve element for connection to internal threads within the water valve seat housing. A generally cylindrical splash guard which is open at both ends and which is threaded internally at one open end surrounds the valve stem and is held in position thereon by a pin which extends through the stem The splash guard can be made as a unitary cast metal piece. An internal washer seals the other open end of the splash guard, which extends around a portion of the circular handle. The hose bib is threaded to accommodate a known spring loaded anti-siphoning vacuum valve, which is, in turn, threaded to accommodate a standard hose connection. As is known in the art, the hose bib threads can be a different size so that the vacuum valve cannot be removed and a hose connected directly to the hose bib.

During assembly, a valve stem assembly, which includes the unitary valve stem, the water valve element, the drain valve element, the splash guard and the circular handle, is inserted into the cast housing through the drain opening cylinder and into the water valve seat housing and conduit. The splash guard is then threaded onto the external threads of the drain opening cylinder and the hydrant is ready for installation.

The resultant hydrant is inexpensive, incorporates a minimal number of working parts, is oriented and labeled to assure proper installation, and includes an integral splash guard to prevent the inadvertent spraying of water onto a user.

OBJECTS AND ADVANTAGES OF THE INVENTION

The principal objects of the present invention are: to provide an improved anti-siphoning freezeless water hydrant; to provide such a hydrant which includes a minimal number of separate working parts; to provide such a hydrant which includes a unitary cast metal housing which is designed and labeled to assure proper drainage of water from the hydrant; to provide such a hydrant which includes a single unitary valve stem which includes an integral drain valve element attached thereto; to provide such a hydrant which includes a splash guard attached to the valve stem to prevent the inadvertent splashing of water onto a user; to provide such a hydrant, the hose bib of which incorporates an anti-siphoning vacuum valve; to provide such a hydrant which is inexpensive to manufacture and produce, which is reliable, and which is easily repairable; and to provide such a hydrant which is particularly well adapted for its intended purpose.

Other objects and advantages of this invention wil become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is an enlarged longitudinal sectional view of the hydrant, taken along line 4—4 of FIG. 2 with an anti-siphoning valve removed, and illustrates a water valve open with a drain valve closed.

FIG. 5 is a view of the hydrant similar to FIG. 4 and illustrates the water and drain valves closed.

FIG. 6 is a view of the hydrant similar to FIG. 4 and illustrates the water valve closed and the drain valve opened.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
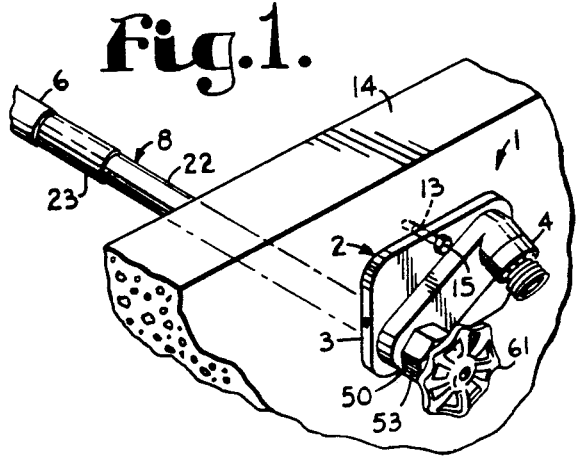
FIG. 1 is a perspective view of an anti-siphoning freezeless hydrant in accordance with the present invention, shown inserted through a wall, and partially shown in phantom lines.
Figure 2:
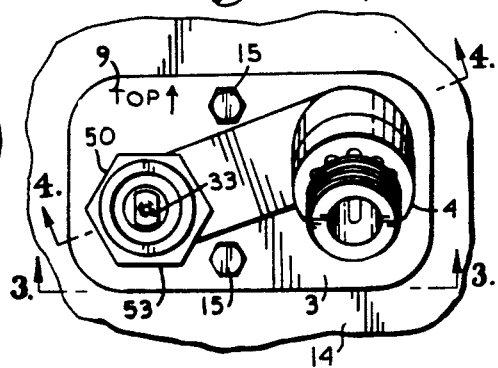
FIG. 2 is an enlarged front elevational view of the hydrant with an operating knob removed.
Figure 3:
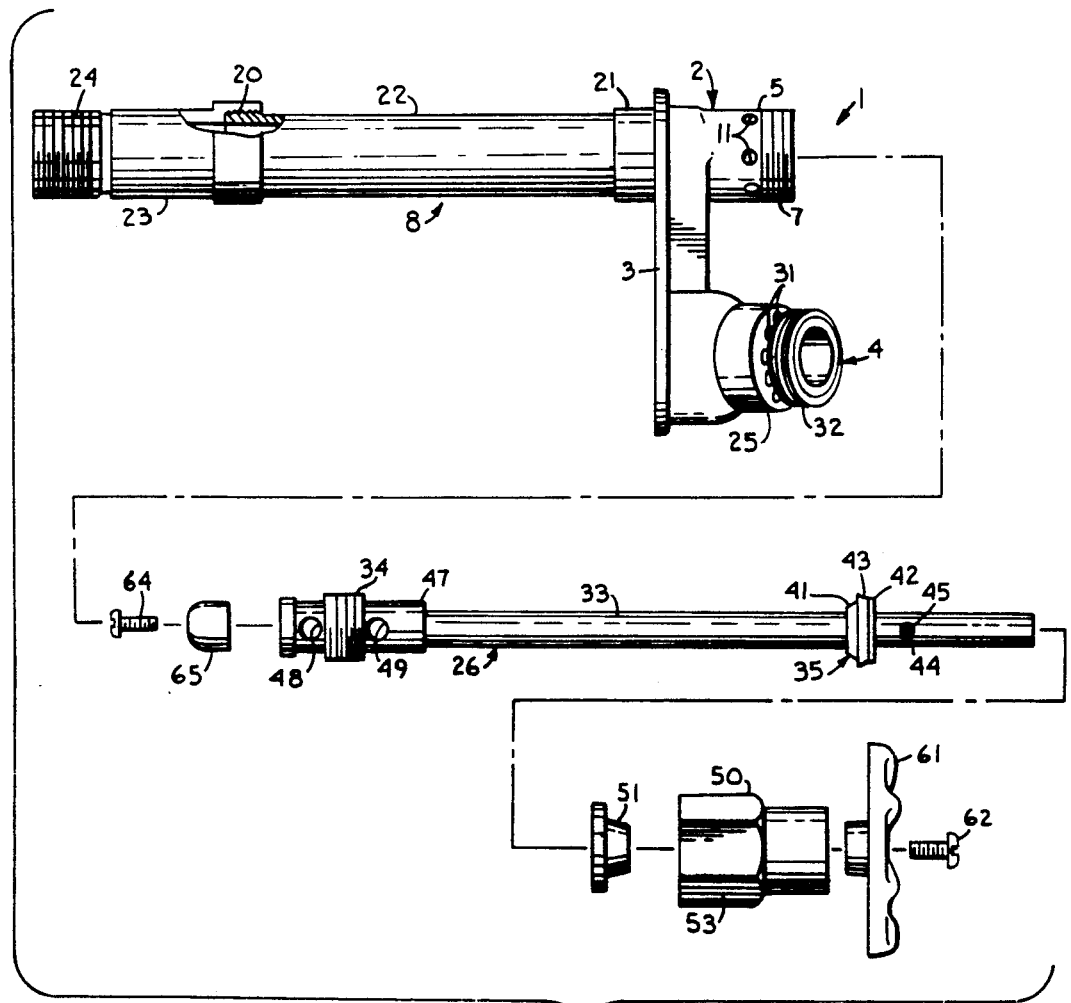
FIG. 3 is an enlarged exploded bottom plan view of the hydrant, taken along line 3—3 of FIG. 2, and illustrating the internal and external parts thereof

Referring to FIG. 1, the reference numeral 1 generally indicates an anti-siphoning, freezeless hydrant in accordance with the present invention. The hydrant 1 comprises a cast metal housing 2 which includes a generally rectangular flange 3 which is labeled with a "TOP" label 9 (FIG. 2), or other indicia, to provide an installer with a clear indication of the correct orientation for the hydrant 1. The housing 2 also includes a threaded outlet or hose bib 4 and a tubular neck or drain opening cylinder 5 which is equipped with external threads 7. Note that the hose bib 4, when the hydrant 1 is correctly installed, is higher than the drain opening cylinder 5. The drain opening cylinder 5 also has a plurality of drainage orifices 11 located about the periphery thereof (FIG. 3). The housing 2 also includes an enclosed channel 12 which connects the drain opening cylinder 5 with the hose bib 4, and two bores 13 through the flange 3, one of which is shown in phantom lines in FIG. 1, for attachment of the housing 2 to a wall 14 of a building via a pair of screws or bolts 15.

The hydrant 1 will now be described with reference to FIG. 3. The valve assembly 8 includes the cast housing 2 which has a circular seat 21 for receiving one end of an elongated water valve conduit 22 via a sweat fitting or the like. A distal end of the conduit 22 is attached to a water valve seat housing 23, again via a sweat fitting or the like. The water valve seat housing 23 is equipped with internal threads 20 (FIG. 3), and external threads 24. The external threads 24 are for engaging an internally threaded water supply line 6 as shown in FIG. 1. The length of the conduit 22 allows installation of the housing 2 on an external surface of the wall 14 while extending the valve seat housing 23 past an inner surface of the wall 14, away from possibly freezing temperatures and providing access to the connection of the supply conduit 6 to the valve seat housing 23.

The hose bib 4 has attached thereto a conventional vacuum break valve 25 which includes air vents 31 positioned about a periphery thereof. The vacuum valve 25 functions in a known manner to prevent liquid from a hose (not shown), connected to the hose bib 4 by threads 32 thereon, from being back-siphoned into the hydrant 1. As described above, when the hydrant 1 is opened and normal water pressure is present in the supply line 6, the vacuum valve 25 opens to permit water to flow from the hydrant 1 to a connected hose. In the event of a pressure drop in the supply line 6, the vacuum valve 25 is closed, via a spring loaded valve mechanism (not shown), to prevent liquid from being back-siphoned into the hydrant 1. It should be noted that the air vents 31 are closed off when the vacuum valve 25 is opened and opened when the vacuum valve 25 is closed.

An elongated valve stem assembly 26 includes a unitary, single diameter valve stem o spindle 33 which is equipped with external stem or spindle threads 34 for engaging the internal threads 20 of the water valve seat 23. The valve stem 33 has a hydrant drain valve element 35 mounted thereon and sized to engage an internal seat surface 36 (FIGS. 5 and 6) of the drain opening cylinder 5. The drain valve element 35 comprises opposing circular flanges 41 and 42 with a resilient washer or O-ring 43 sandwiched therebetween. The washer 43 is removable from the valve element 35 and is, therefore, replaceable. A bore 44 extends laterally through the valve stem 33 to accommodate a spacing pin 45, one end of which is shown in FIG. 3. The spacing pin 45 extends beyond the valve stem 33 on either side of the bore 44.

The threads 20 of the housing 23 and the threads 34 of the valve stem 33 impede the flow of water from the supply conduit 6 to the valve assembly conduit 22. To provide a path past the threads 20 and 34, a bore 46 is formed through a cylindrical water valve carrier 47 which is affixed, as by welding, to a distal end of the stem 33. The carrier 47 has the stem threads 34 formed thereon. Sets of apertures 48 and 49, positioned on opposite longitudinal sides of the threads 34 communicate with the bore 46 and provide a path for water to bypass the threads 20 and 34 from the supply conduit to the valve conduit 22.

A circular cap seal washer 51 has an internal opening which is sized to fit snugly around the valve stem 33 and an external diameter which is designed to fit snugly and seal between the valve opening cylinder 5 and a cap nut or collar 50 which supports an outer end of the valve stem 33. The washer 51 additionally seals between the stem 33 and the collar 50. The collar 50 includes a larger diameter portion 53, which may be hexagonal in shape, for use of a wrench thereon, and is equipped with internal threads 55, as shown in FIG. 4. The portion 53 of the collar 50 functions as a splash shield and extends over the drainage orifices 11 and is diametrically spaced from the drain opening cylinder 5 to allow water from the orifices 11 to pass therebetween. The splash shield 54 deflects water from the orifices 11, which may be pressurized, back toward the housing 2 and away from a operator of the hydrant 1. The collar 50 fits over the valve stem 33 and is properly positioned thereon by the spacing pin 45, which prevents it from sliding too far onto the valve stem 33.

A circular handle or knob 61 is attached to one end of the valve stem 33 via a threaded screw 62 which fits in a threaded bore (not shown) in an outer end of the valve stem 33. A resilient water valve element 65 is attached to an inner end of the valve stem 33 by way of the valve carrier 67 by a screw 64 which is received in a threaded bore (not shown) therein.

During assembly of the hydrant 1, the valve stem assembly 26 is inserted into valve seat assembly 8 via the drain opening cylinder 5, and extends through the conduit 22. The collar 50 is then turned clockwise to engage its internal threads 55 with the external threads 7 of the drain opening cylinder 5, which holds the valve stem assembly 26 securely within the drain opening cylinder 5.

The configuration of the valve stem assembly 26 as a one-piece unit greatly simplifies assembly of the hydrant 1, as well as disassembly for maintenance of the hydrant 1 by minimizing the number of parts which must be dealt with during assembly and disassembly and by minimizing the likelihood of separation of internal parts during use. To remove the valve stem assembly 26, it is only necessary to unthread the collar 50 from the threads 7, turn the handle 61 to unthread the stem threads 34 from the threads 20, and slide the stem assembly 26 out of the conduit 22. This provides access to the water valve element 65 for replacement. If it is necessary or desirable to replace the drain valve washer 43 or the seal washer 51, the handle 61 and the collar 50 can be removed. The spacer pin 45 is preferably in the form of a roll pin which may be removed to facilitate replacement of the drain valve washer 43, although this is not usually necessary.

The operation of the hydrant 1 will now be described with reference to FIGS. 4-6. FIG. 4 illustrates the hydrant 1 with the water valve element 65 spaced from a valve seat 71 within the water valve seat housing 23. This is accomplished in a conventional fashion by turning the handle 61 in a counter-clockwise direction, which partially backs the external threads 34 on the valve stem 33 out of internal threads 20 within the water valve seat housing 23, and thus draws the water valve element 65 away from the valve seat 71. This permits water to flow from the supply conduit 6, into the conduit 22, through the channel 12, and out the hose bib 4, as indicated by the arrows in FIG. 4. At the same time, the drain valve element 35 is firmly held within the drain opening cylinder 5 to prevent water within the conduit 22 from exiting through the drain orifices 11.

In FIG. 5, the handle 61 has been turned clockwise sufficiently to seat the element 65 within the valve seat 71, but not enough to advance the drain valve element 35 out of the drain opening cylinder 5. In this position, water which is trapped within the conduit 22 and the housing 2 has no outlet. For operation in warmer temperatures, with no threat of freezing, this position can be used to shut off the hydrant 1. In below-freezing temperatures, water trapped within the conduit 22 and the housing 2 could freeze, blocking and/or damaging the hydrant 1. In such conditions, the position illustrated in FIG. 6 is used to shut off the hydrant 1.

In FIG. 6, the handle 61 has been turned clockwise until the drain valve element 35 is beyond the neck of the drain opening cylinder 5, and water which is trapped within the conduit 22 and the housing 2 can exit the hydrant 1 by flowing around the drain valve element 35, into the drain opening cylinder 5, and out the drain orifices 11, as indicated by the arrows in FIG. 6. It should be noted that the conduit 22 is angled downward slightly from the valve seat housing 23 toward the housing 2 to direct water within the conduit 22 toward the valve opening cylinder 5 and the orifices 11 therethrough. In addition, with the drain valve element 35 removed from the drain opening cylinder 5, internal pressure within the hydrant 1 is released.

Thus, water within the hose bib 4 and the housing channel 12 drains through the orifices 11 since the drain opening cylinder 5 is located at the lowest point of the hydrant 1, when properly installed. If there is any back pressure within a hose (not shown) connected to the hose bib 4, such as a pressure head created by portions of the hose being elevated, such pressure will be released by drainage of water in the hose through the orifices 11. The orifices 11 also provide for the entry of air into the hydrant 1 to allow the hydrant 1 to drain substantially completely. The splash shield 53 deflects any water exiting the orifices 11 under pressure away from an operator of the hydrant 1.

While the housing 2 and other portions of the hydrant 1 have been described as comprised of metal, it should be apparent that significant portions of the hydrant 1 can be constructed of plastic or other suitable materials.

It is to be understood that while certain forms of the present invention have been illustrated and described herein, it is not to be limited to the specific forms or arrangement of parts described and shown.

What is claimed and desired to be secured by Letters Patent is as follows:

1. A hydrant apparatus comprising:
   (a) a housing with an outer side and an inner side;
   (b) a tubular neck extending from said outer side of said housing and having an internal seat surface;
   (c) a fluid conduit extending from said inner side of said housing and fluidically communicating with said neck, said fluid conduit adapted for connection of a supply conduit thereto;

(d) a fluid outlet extending from said outer side of said housing and fluidically communicating with said fluid conduit and said neck;

(e) a fluid valve seat positioned in said fluid conduit;

(f) an elongated one piece valve stem supported through said neck and having a fluid valve member positioned on an inner end thereof, said fluid valve member adapted to engage and disengage from said fluid valve seat upon movement of said stem to thereby control communication of fluid from said supply conduit to said outlet by way of said fluid conduit;

(g) a handle positioned on an outer end of said stem for grasping to move said stem;

(h) at least one hydrant drain orifice formed through said neck and positioned to drain a fluid from said neck;

(i) a drain valve member positioned on said stem in spaced relation to said fluid valve member and positioned on said stem to engage said seat surface of said neck when said fluid valve member disengages said fluid valve seat and to disengage from said seat surface when said drain valve member fully engages said fluid valve seat to enable drainage of a fluid from said fluid conduit, said outlet, and said neck;

(j) a head cap received on said neck to support said stem therethrough; and (k) said head cap including a splash shield having an end portion threadably engaged with said neck and positioned exteriorly in an extended and spaced manner about said orifice and in deflecting relation to said orifice to deflect fluid exiting said orifice away from an operator of said apparatus.

2. An apparatus as set forth in claim 1 and including:

(a) a plurality of drain orifices formed through said neck in circumferentially spaced relation; and (b) said splash shield threadably engaging said cap in surrounding relation to said orifices and in radially spaced relation to said neck.

3. An apparatus as set forth in claim 1 and including:

(a) anti-siphon valve means positioned in said outlet and operative to prevent fluid communication from said outlet into said fluid conduit and said supply conduit.

4. In a freezeless hydrant apparatus formed of multiple components including a body component, a valve component with a valve stem, a cap component surrounding said stem, sand a drain orifice to drain fluid from said apparatus, the improvement comprising:

(a) a tubular valve stem support neck forming a portion of and extending from said body component and including said drain orifice formed through said neck;

(b) splash guard means attached to said tubular valve support neck and positioned in deflecting relation to said orifice to deflect fluid exiting said orifice away from an operator or said apparatus;

(c) said cap component having an end portion threadably received exteriorly on said neck and having said stem extending therethrough; and (d) said splash guard means extending from said end portion of said cap component in surrounding relation to said orifice and spaced radially from said neck and said orifice, so as to deflect fluid exiting said orifice.

5. An apparatus as set forth in claim 4 wherein:

(a) there are a plurality of said drain orifices arranged circumferentially around said neck; and (b) said splash guard means threadably engages said neck in surrounding relation to said plurality of orifices.

6. An apparatus as set forth in claim 4, wherein:

(a an elongated inlet conduit extends from said body component and has a valve seat at a distal end of said conduit;

(b) said valve stem is elongated and has said valve component positioned at a distal end of said stem to selectively engage said valve component; and (c) said stem is a one piece unit.

7. An apparatus as set forth in claim 6 wherein:

(a) said neck has an internal drain valve seat surface; and (b) said stem has a drain valve member mounted thereon and positioned to engage said seat surface when said flow valve member disengages said valve seat and to disengage from said seat surface when said flow valve member engages said valve seat.

8. An apparatus as set forth in claim 4 and including:

(a) a fluid inlet positioned on said body component and adapted for fluid connection to a fluid supply conduit;

(b) a fluid outlet positioned on said body component in fluid communication with said inlet, said outlet being adapted for connection of hose means thereto;

(c) said valve component being positioned to control communication of fluid from said inlet to said outlet; and (d) anti-siphon valve means positioned in said outlet and operative to prevent fluid communication from said outlet to said inlet and to said supply conduit.

9. A hydrant apparatus comprising:

(a) fluid inlet means;

(b) fluid outlet means fluidically communicating with said inlet means;

(c) valve means movable to control fluid communication between said inlet means and said outlet means;

(d) valve control means connected to said valve means and operable to reversibly move said valve means between a closed position inhibiting said fluid communication and a fully open position maximizing said fluid communication through a range of partially open positions;

(e) valve control support means supporting said valve control means;

(f) a drain orifice formed through said support means at a position to drain fluid from said outlet means, said support means, and said inlet means between said valve means and said outlet when said valve means is in said closed position;

(g) a hydrant housing having said inlet means and said outlet means positioned thereon;

(h) said valve control support means including a tubular support neck extending from said housing and having said valve control means extending therethrough, said drain orifice being formed through said neck;

(i) a head cap having an end portion threadably and exteriorly received on said neck and cooperating with said neck to support said valve control means; and (j) splash shield means extending integrally from an end portion of said cap in a surrounding relation to said orifice and spaced radially from said neck and orifice, so as to be positioned in a deflecting relation to said orifice to deflect fluid exiting said orifice away from an operator of said apparatus.

10. An apparatus as set forth in claim 9, wherein:
(a) said neck has a plurality of drain orifices formed therethrough and positioned in circumferentially spaced relation thereabout; and
(b) said splash shield means extends integrally from said cap in surrounding relation to said orifices and in radially spaced relation to said neck.

11. An apparatus as set forth in claim 9 wherein:
(a) said fluid inlet means is elongated and has a flow valve seat positioned at a distal end thereof;
(b) said valve control means includes a one piece valve stem extending between a proximal end at said valve control support means toward a distal end at said distal end of said inlet means; and
(c) said valve means includes a flow valve member positioned at said distal end of said stem and adapted to inhibit fluid communication between said inlet means and said outlet means upon engaging said valve seat and to enable said fluid communication upon disengaging said valve seat.

12. An apparatus as set forth in claim 11 wherein:
(a) said neck has an internal drain valve seat surface; and
(b) said stem has a drain valve member mounted thereon and positioned to engage said seat surface when said flow valve member disengages said valve seat and to disengage from said seat surface when said flow valve member engages said valve seat.

13. An apparatus as set forth in claim 9 and including:
(a) anti-siphon valve means positioned in said outlet means and operative to prevent fluid communication from said outlet means into said inlet means.

14. An apparatus as set forth in claim 9 wherein:
(a) said neck has an internal drain valve seat surface; and
(b) said stem has a drain valve member mounted thereon and positioned to engage said seat surface when said flow valve member disengages said valve seat and to disengage from said seat surface when said flow valve member engages said valve seat.

15. A hydrant apparatus comprising:
(a) fluid inlet means;
(b) fluid outlet means fluidically communicating with said inlet means;
(c) valve means movable to control fluid communication between said inlet means and said outlet means;
(d) valve control means connected to said valve means and operable to reversibly move said valve means between a closed position inhibiting said fluid communication and a fully open position maximizing said fluid communication through a range of partially open positions;
(e) valve control support means supporting said valve control means, said valve control support means including a tubular support neck and having said valve control means extending therethrough;
(f) said neck having an internal drain valve seat surface;
(g) a stem forming a portion of said valve control means and having a drain valve member mounted thereon and positioned to engage said seat surface when said flow valve member disengages said valve seat and to disengage from said seat surface when said flow valve member engages said valve seat;
(h) a head cap having an end portion threadably and exteriorly received on said neck and cooperating with said neck to support said valve control means; and
(i) splash shield means extending integrally from an end portion to said cap in a surrounding relation to said orifice and spaced radially from said neck and orifice so as to be positioned in a deflecting relation to said orifice to deflect fluid exiting said orifice away from an operator of said apparatus.

* * * * *